United States Patent
Itoh et al.

(10) Patent No.: US 8,269,437 B2
(45) Date of Patent: Sep. 18, 2012

(54) ROTARY ELECTRIC MACHINE CONTROL SYSTEM

(75) Inventors: Takeshi Itoh, Nagoya (JP); Takashi Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 438 days.

(21) Appl. No.: 12/566,049

(22) Filed: Sep. 24, 2009

(65) Prior Publication Data

US 2010/0072926 A1    Mar. 25, 2010

(30) Foreign Application Priority Data

Sep. 24, 2008  (JP) ................................. 2008-243738

(51) Int. Cl.
 *H02P 21/00*  (2006.01)
(52) U.S. Cl. .............. 318/400.02; 318/432; 318/400.09; 318/799
(58) Field of Classification Search .................. 318/432, 318/434, 437, 400.01, 799, 727, 801, 400.02, 318/400.07, 400.09, 400.14, 400.22; 388/811
See application file for complete search history.

(56) References Cited

U.S. PATENT DOCUMENTS

| | | | | |
|---|---|---|---|---|
| 6,781,033 B2 * | 8/2004 | Staub et al. | ..................... | 800/278 |
| 7,723,945 B2 * | 5/2010 | Okamura | ...................... | 318/805 |
| 7,828,093 B2 * | 11/2010 | Hanada et al. | ............ | 180/65.265 |
| 7,893,637 B2 * | 2/2011 | Suhama et al. | ................ | 318/376 |
| 7,960,930 B2 * | 6/2011 | Sato | ............................... | 318/432 |
| 8,013,556 B2 | 9/2011 | Hattori et al. | | |

FOREIGN PATENT DOCUMENTS

| | | |
|---|---|---|
| EP | 1 950 878 | 7/2008 |
| WO | WO 2007/066182 | 6/2007 |
| WO | WO 2008/001524 | 1/2008 |

OTHER PUBLICATIONS

U.S. Appl. No. 12/566,070, filed Sep. 24, 2009, naming Takeshi Itoh et al, as inventors.
U.S. Appl. No. 12/566,107, filed Sep. 24, 2009, naming Takeshi Itoh et al, as inventors.

* cited by examiner

*Primary Examiner* — Walter Benson
*Assistant Examiner* — Antony M Paul
(74) *Attorney, Agent, or Firm* — Nixon & Vanderhye P.C.

(57) ABSTRACT

A control unit for a rotary electric machine includes a first current command module, a second current command module, a change module, and a return module. The first module performs a first current command on a maximum efficiency characteristic line on a d-q plane thereby to drive the machine at a maximum efficiency. The second module performs a second current command on a switching line set at a retard angle side relative to the maximum efficiency characteristic line. The change module changes a control mode from a rectangular wave voltage phase control mode to an overmodulation current control mode when an operation point of the machine reaches the switching line. The return module returns the current command from the second command to the first command after performance of the second command for a predetermined period.

19 Claims, 9 Drawing Sheets

ROTARY ELECTRIC MACHINE CONTROL SYSTEM

CROSS REFERENCE TO RELATED APPLICATION

This application is based on and incorporates herein by reference Japanese Patent Application No. 2008-243738 filed on Sep. 24, 2008.

This patent application is related to co-pending U.S. patent applications arising from Japanese patent applications No. 2008-243633 filed on Sep. 24, 2008 (IPICS 122526-US-KK/mk) and No. 2008-243648 filed on Sep. 24, 2008 (IPICS 122525-US-KK-nk).

FIELD OF THE INVENTION

The present invention relates to a rotary electric machine control system and, more particularly, to a rotary electric machine control system, which switches over a control mode among a sinusoidal wave current control mode, an overmodulation current control mode and a rectangular wave voltage phase control mode.

BACKGROUND OF THE INVENTION

In driving a rotary electric machine by an inverter, a control mode is switched over among a sinusoidal wave current control mode, an overmodulation current control mode and a rectangular wave voltage phase control mode. The rectangular wave voltage phase control mode, which uses one-pulse switching, is required to attain both high output power and size reduction of the rotary electric machine. The rotary electric machine is controlled optimally by switching over the control mode between the sinusoidal wave current control mode, which provides a superior characteristic in a low speed region, and the overmodulation current control mode, which is used in an intermediate rotation speed region.

In the sinusoidal wave current control mode and the overmodulation current control mode, current feedback control is performed to output a pulse-width modulation (PWM) pattern to the rotary electric machine by comparing a command voltage and a carrier wave voltage. In the rectangular wave voltage phase control mode, torque feedback control is performed to output a one-pulse switching waveform to the rotary electric machine in accordance with an electric angle by fixing an amplitude of the voltage to a maximum value and controlling phase.

The switching-over among the three modes, that is, from the sinusoidal wave current control mode to the overmodulation current control mode and from the overmodulation current control mode to the rectangular wave voltage phase control mode are performed based on a rate of modulation or an amplitude of a command voltage corresponding to the modulation rate. Since the command voltage amplitude is fixed in the rectangular wave voltage phase control mode at the time of the switching-over from the rectangular wave voltage phase control mode to the overmodulation current control mode, the time point of switching-over is determined based on a phase of an actual current relative to a command current.

Patent document 1 discloses that a conventional control apparatus for a motor drive system has variations in output torque at the time of switching-over from a PWM modulation control method and a rectangular wave voltage control method. In this apparatus, torque is estimated by calculating power from phase currents Iu, Iv, Iw and a voltage V in the rectangular wave voltage control method, and a torque difference is fed back to a command torque. In the PWM modulation control method, the phase currents Iu, Iv, Iw are converted to a d-axis current Id and a q-axis current Iq, and an Id current difference and an Iq current difference are fed back to an Id command current and an Iq command current. Therefore, both the PWM modulation control method and the rectangular wave voltage control method use the currents Id and Iq determined by a current sensor and a rotation angle sensor thereby to ensure stability of the output torque controllability.

Patent document 2 discloses an AC motor drive control system, in which a control mode is switched over from a PWM current control mode to an overmodulation control mode when an amplitude of a voltage exceeds 1.00 time of a peak value of a reference triangular wave voltage. The control mode is switched over to a rectangular wave voltage phase control mode when the amplitude of the voltage exceeds 1.27 times of the peak value of the reference triangular wave voltage. The control mode is switched over from the rectangular wave voltage phase control mode back to the overmodulation current control mode when an absolute value of phase of an actual current decreases to be less than an absolute value of phase of a command current.

Low-pass filtering is performed on a measured current, because a d-axis current and a q-axis current include periodic noises and high frequency components. Due to this filtering, the switching-over from the rectangular wave voltage phase control mode to the overmodulation current control mode is sometimes delayed. This delay causes hunting of current phase and unstable control. Therefore, the delay in switching-over from the rectangular wave voltage phase control mode to the overmodulation current control mode is reduced by comparing a required voltage amplitude VR taking into consideration of induced voltages and the like with the peak value of the reference triangular wave voltage and providing an offset value for preventing chattering.

Patent document 3 discloses a motor drive system, in which an excessive voltage is generated inside the motor drive system due to excessive regenerative electric power, when an AC motor generates excessive electric power, which exceeds a level acceptable at a DC power source side, that is, an input side. Therefore, electric power consumption of the AC motor is increased to suppress the regenerative electric power supplied to the input side. In PWM control, an optimum efficiency characteristic line, which connects maximum efficiency points in relation to current phase and output torque, is determined with respect to a current amplitude. A loss increase characteristic line is determined as a set of current operation points, which are current phase-shifted from the optimum efficiency characteristic line, so that the control is performed on the loss increase characteristic line. In a rectangular wave voltage control, a supply voltage to a motor is controlled in respect of only phase and a current phase is fixed. Therefore, a required voltage for the motor is decreased by setting the current operation point to an advanced side in a relation of a supply voltage to a motor (motor interphase voltage) and a current phase in respect of torque, so that motor current is controlled in accordance with the PWM control. Thus, motor drive efficiency is decreased while ensuring torque controllability.

Patent document 1: JP 2007-159368A (WO 2007/066182A1)
Patent document 2: JP 2008-11682A (WO 2008/001524A1)
Patent document 3: JP 2007-151336A (EP 1950878A1)

As described above, the control mode is switched over from the rectangular wave voltage phase control mode to the overmodulation current control mode by determining the switching time point in accordance with the current phase of the actual current relative to the command current. If the switching time point is determined in the advance side in a d-q plane relative to the command current as a reference, the control chatters and current fluctuates at the time of switching over the control mode. For this reason, the switching time point is determined at a retard side in the d-q plane relative to the command current as the reference.

Even if a mode switching determination line is set in the retard angle side relative to the command current, the actual current in the switching determination line deviates largely from the command current, to which the current should be controlled, immediately after the control mode is switched over form the rectangular wave voltage phase control mode to the overmodulation current control mode. Because of this large deviation, a command voltage calculated in the overmodulation current control mode is likely to change suddenly relative to a maximum amplitude, which is the last command voltage in the rectangular wave voltage phase control mode, and a phase at that time. Therefore the PWM pattern actually outputted to the rotary electric machine becomes asymmetric. As a result, disturbance of currents and decrease of torque are caused.

SUMMARY OF THE INVENTION

It is therefore an object of the present invention to provide a rotary electric machine control system, which smoothly switches over a control mode from a rectangular wave voltage phase control mode to an overmodulation current control mode.

According to one aspect of the present invention, a rotary electric machine control system includes a control nit, which switches over a control mode of the rotary electric machine among a sinusoidal wave current control mode, an overmodulation current control mode and a rectangular wave voltage phase control mode. The control unit performs a first current command on a maximum efficiency characteristic line formed by connecting pairs of a d-axis current and a q-axis current on a d-q plane formed of a d-axis and a q-axis orthogonal to each other. Each pair corresponds to an operation point at which a rotary electric machine operates at a maximum efficiency. The control unit switches over the control mode from the rectangular wave voltage phase control mode to the overmodulation current control mode, when the operation point of the rotary electric machine reaches a switching line, which is provided at a retard angle side on the d-q plane and has a predetermined phase difference relative to the maximum efficiency characteristic line. The control unit further performs a second current command on the switching line for a predetermined period after the control mode is switched over to the overmodulation current control mode.

Preferably, the control unit returns a current command from the second current command to the first current command, which is performed on the maximum efficiency characteristic line, after performing the second current command on the switching line for the predetermined period.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to one exemplary embodiment of a rotary electric machine control system, in which a rotary electric machine is mounted in a vehicle. This control system may be applied to any other rotary electric machines, which are controlled by switching over a control mode among a sinusoidal wave current control mode, an overmodulation current control mode and a rectangular wave voltage phase control mode. Although this control system controls two motor-generators, each of which has a motor function and a generator function, it may control one rotary electric machine having only a motor function and one rotary electric machine having only a generator function. Further, it may control only one motor-generator or three or more motor-generators.

Figure 1:
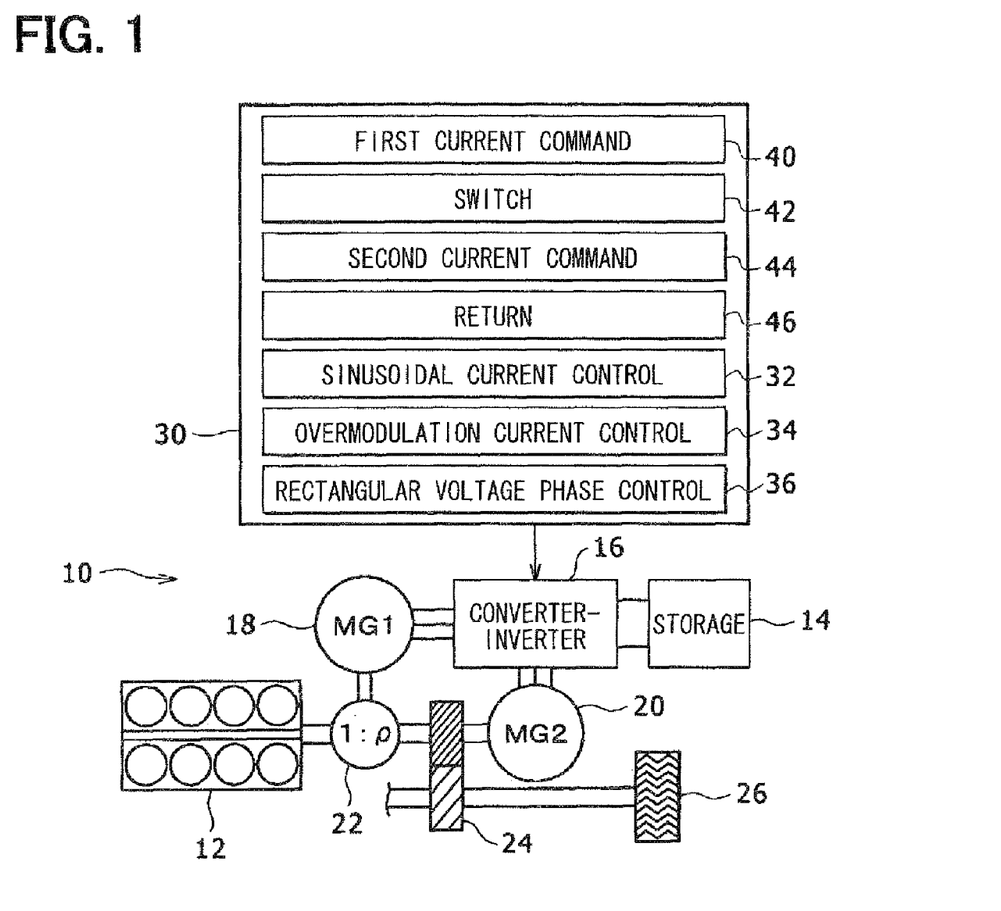
FIG. 1 is a block diagram showing a rotary electric machine control system according to an embodiment of the present invention.

Referring first to FIG. 1, a rotary electric machine control system 10 is provided for a rotary electric machine provided in a hybrid vehicle.

The vehicle has an engine 12 and an electric storage device (battery) 14, which are provided as drive power sources, a first rotary electric machine (MG1) 18 and a second rotary electric machine (MG2) 20. The vehicle further has an electric power circuit 16, a drive power distribution mechanism 22, a transmission 24, drive wheels (tire wheels) 26 and an electronic control unit 30. The power circuit 16 is a converter-inverter connected between the storage device 14 and the two rotary electric machines 18, 20. The power distribution mechanism 22 is for distributing driver power among the engine 12, the first rotary electric machine 18 and the second rotary electric machine 20. The transmission 24 is provided between the drive power distribution mechanism 22 and the second rotary electric machine 20. The drive wheels 26 receive drive power from the transmission 24. The control unit 30 is configured to control respective operations of these automotive parts and components.

The rotary electric machine control system 10 is primarily formed by the rotary electric machines 18, 20, the power circuit 16 and the control unit 30. The other parts and components are assembled in the similar manner as in conventional hybrid vehicles.

Each of the first rotary electric machine 18 and the second rotary electric machine 20 is a motor-generator (MG) and mounted in the vehicle. The motor-generator is a three-phase synchronous rotary machine, which operates as an electric motor when electric power is supplied from the storage device 14 and operates as an electric power generator when it is driven by the engine 12 or the vehicle is braked.

The first rotary electric machine 18 is used as the generator by being driven by the engine 12 to supply generated electric power to the storage device 14 through the converter-inverter of the power circuit 16. The second rotary electric machine 20 is used to drive the vehicle. It operates as the motor and drives the drive wheels 26 of the vehicle during a power running period by receiving electric AC power to which an electric DC power of the storage device 14 is converted by the converter-inverter of the power circuit 16. It also operates as the generator and restores regenerative energy to the storage device 14 through the converter-inverter of the power circuit 16 during a braking period of the vehicle.

The power circuit 16 is provided between the storage device 14 and the two rotary electric machines 18 and 20 as described above, and includes smoothing capacitors and the like in addition to the converter and the inverter.

The converter of the power circuit 16 is provided between the storage device 14 and the inverter and has a voltage conversion function. The converter may be configured to include a reactor and a switching element, which operates under control of the control unit 30. The voltage conversion function includes a step-up function and a step-down function. By the step-up function, a voltage at the storage device side is boosted by using the energy storing operation of the reactor function and supplied to the inverter side. By the step-down function, power from the inverter side is reduced and supplied to the storage device side as electric charge power. The converter may be referred to as a booster circuit when operating to perform the step-up function.

The inverter of the power circuit 16 is provided for converting power between AC power and DC power. The inverter includes a plurality of switching elements, which operate under control of the control unit 30. Since the first rotary electric machine 18 and the second rotary electric machine 20 are used for different purposes and operate at different operation points from each other, the inverter includes two (first and second) inverter circuits. The first inverter circuit is for the first rotary electric machine 18 and the second inverter circuit is for the second rotary electric machine 20.

When the first rotary electric machine 18 is operated as the generator, the first inverter circuit performs an AC-DC conversion function thereby to convert the AC three-phase regenerative power from the first rotary electric machine 18 to the DC power and supply the DC power as the charge current to the storage device 14. When the vehicle is in power running, the second inverter circuit for the second rotary electric machine 20 performs a DC-AC conversion function thereby to convert the DC power from the storage device 14 to the AC three-phase drive power and supply the AC drive power to the second rotary electric machine 20. When the vehicle is in braking, the second inverter circuit performs an AC-DC conversion function thereby to convert the AC three-phase regenerative power from the second rotary electric machine 20 to the DC power and supply the DC power as the charge current to the storage device 14.

The control unit 30 is configured to perform a variety of control functions, which include, for example, control of operation of the engine 12, control of operations of the two rotary electric machines 18, 20, control of operation of the power circuit 16, control of operation of the drive power distribution mechanism 22 and control of operation of the transmission 24.

The control unit 30 is configured by a computer, for example, which is suited for mounting in the vehicle. The control operation may be performed by only one computer, or may be shared by a plurality of computers from the standpoint that the control objects are controlled at different control processing speeds. For example, the operation of the engine 12 is controlled by one computer (engine ECU), the operations of the two rotary electric machines 18, 20 are controlled by one computer (motor-generator ECU), the operation of the power circuit 16 is controlled by one computer (power ECU), and the entire operation of the system is controlled by one computer (management ECU).

The control unit 30 is shown, in FIG. 1, as having functional parts for smoothly switching over the control mode of the two rotary electric machines 18 and 20 as a control function for the rotary electric machines 18 and 20 among the variety of functions. Specifically, the control unit 30 includes a sinusoidal wave current control module 32, an overmodulation current control module 34 and a rectangular wave voltage phase control module 36 for performing sinusoidal wave current control, overmodulation current control and rectangular wave voltage phase control, respectively.

The control unit 30 further includes a first current command module 40, a mode switching module 42, a second current command module 44 and a return module 46 for smoothly switching the control mode from the rectangular wave voltage phase control mode to the overmodulation current control mode.

The first current command module 40 is for performing a first current command on a maximum efficiency characteristic line, which is formed by connecting current pairs of a d-axis current and a d-axis current on a d-q plane formed by a d-axis and a q-axis orthogonal to each other. Each pair of the d-axis current the q-axis current corresponds to an operation point of the rotary electric machine, at which the rotary electric machine operates at maximum efficiency. The first current command module 40 determines a first command current of the rotary electric machine on the maximum efficiency characteristic line. The d-axis, the q-axis and the d-q plane are described in more detail below.

The mode switching module 42 is for performing a switching-over of the control current from the rectangular wave voltage phase control mode to the overmodulation current control mode when the operation point of the rotary electric machine crosses a switching line set at a retard angle side relative to the maximum efficiency characteristic line on the d-q plane. The switching line has a predetermined phase difference in the retard angle side relative to the maximum efficiency characteristic line.

The second current command module 44 is for performing a second current command on the switching line for a predetermined period after the switching-over of the control mode to the overmodulation current control mode. The second current command module 44 determines a second command current of the rotary electric machine on the switching line. Here, the switching line provided for determining the switching-over of the control mode is used as a current command characteristic line, the pair of the d-axis current and the q-axis current of which is used as the second command current.

The return module 46 is for performing return or switchback of the command current to the first command current determined by the maximum efficiency characteristic line again from the second command current after the second current command is performed on a predetermined period by the second current command module 44.

These functions are realized by performing software (computer programs), specifically by performing a control mode switching part in a rotary electric machine control program. These functions may be realized partly by hardware (discrete electronic circuits).

The operation of the embodiment will be described below with particular reference to the control functions of the control unit 30. It is noted that the switching-over of the control mode is described with respect to the second rotary electric machine 20 as an example, because both the first rotary electric machine 18 and the second rotary electric machine 20 are controlled in the similar manner.

First, the sinusoidal wave current control mode, overmodulation current control mode and the rectangular wave voltage phase control mode are described.

The sinusoidal control mode and the overmodulation current control mode are a current feedback mode, in which the second rotary electric machine 20 is controlled in a pulse-width modulation pattern determined by comparing a command voltage and a carrier wave voltage. The rectangular control mode is a control mode, in which the one pulse switching waveform is outputted to the second rotary electric machine 20 in accordance with the electric angle while fixing the voltage amplitude to a maximum value. In this mode, torque is feedback-controlled by fixing the voltage amplitude to a maximum value and varying the phase. These three control modes are performed by the sinusoidal wave current control module 32, the overmodulation current control module 34 and the rectangular wave voltage phase control module 36, respectively.

The switching of the mode among the sinusoidal wave current control mode, the overmodulation current control mode and the rectangular wave voltage phase control mode is performed in accordance with a rate of modulation or a command voltage amplitude corresponding to the modulation rate. The modulation rate is a ratio of a signal amplitude relative to an output voltage of the inverter. In the case of pulse-width modulation (PWM) performed by the comparison of the sinusoidal wave and the triangular wave, the modulation rate is $3^{1/2}/(2 \times 2^{1/2}) = 0.61$. If the rectangular wave is used as the signal amplitude, the modulation rate is $6^{1/2}/\pi = 0.78$.

For this reason, the rectangular wave voltage phase control, which can increase the modulation rate, is preferred so that the second rotary electric machine 20 provides higher output. In the sinusoidal wave current control mode and the overmodulation current control mode, a pseudo-sinusoidal wave formed by PWM technology is used. As a result, the response speed can be increased to be higher than in the rectangular wave voltage phase control mode. For those reasons, the sinusoidal wave current control mode, the overmodulation current control mode and the rectangular wave voltage phase control mode are preferably used in a low speed region, an intermediate speed region and a high speed region, respectively.

Figure 2:
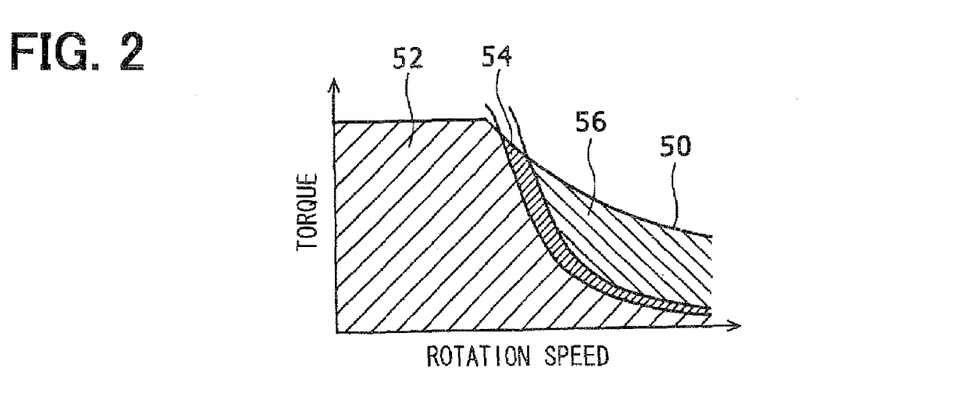
FIG. 2 is a graph showing control modes, which are switched over in accordance with operation points of a rotary electric machine.

The control modes, which are switched over in accordance with the operation point of the rotary electric machine, are shown in FIG. 2. In FIG. 2, the abscissa and the ordinate indicate the rotation speed and the torque of the rotary electric machine 20, respectively. A maximum torque characteristic is indicated by a line 50. The operation regions of the sinusoidal wave current control mode at lower speeds, the overmodulation current control mode at intermediate speeds, and the rectangular wave voltage phase control mode at higher speeds are indicated by numerals 52, 54 and 56, respectively.

The control mode is switched over among the three control modes as follows. As shown in FIG. 2, the control mode is switched over in accordance with the operation point defined by the rotation speed and the torque of the rotary electric machine 20. As the rotation speed and the torque increase, the control mode is switched over from the sinusoidal wave current control mode (region 52) to the overmodulation current control mode (region 54) and from the overmodulation current control mode (region 54) to the rectangular wave voltage phase control mode (region 56). In this instance, the control mode is switched over based on the modulation rate. Specifically, the sinusoidal wave current control mode, the overmodulation current control mode and the rectangular wave voltage phase control mode is performed, when the modulation rate is less than 0.61, between 0.61 and 0.78 and more than 0.78, respectively.

The control mode may also be switched over in the opposite direction based on the modulation rate. However, since the amplitude of the command voltage in the rectangular mode is fixed and not unchanged, the switching-over from the rectangular wave voltage phase control mode to the overmodulation current control mode is performed by determining a time point of the switching-over in accordance with the phase of the actual current relative to the command current.

Figure 3:
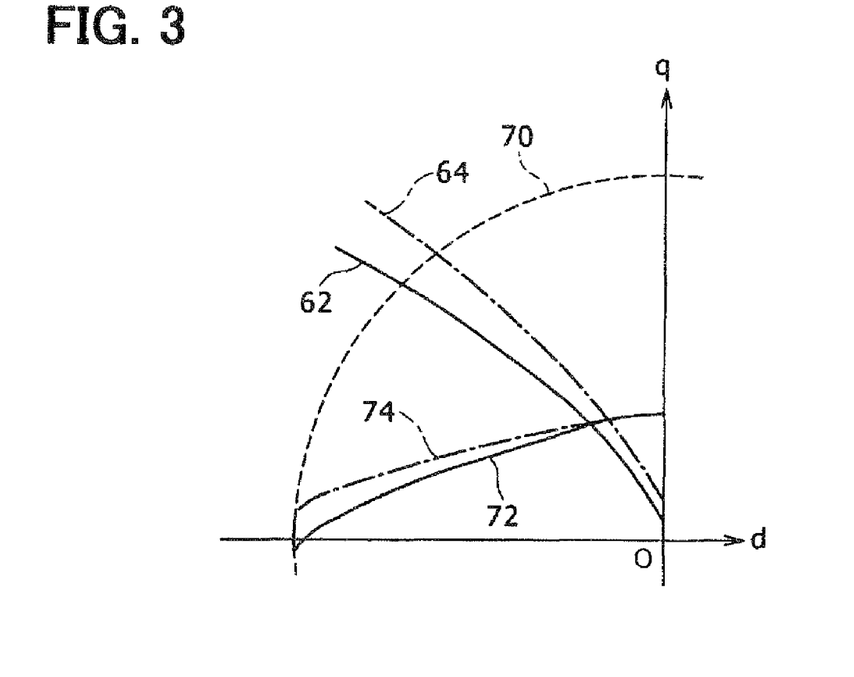
FIG. 3 is a graph showing switching lines, which determine switching time based on a phase of an actual current relative to a command current.

FIG. 3 shows switching lines used to determine switching time points based on a phase of an actual current relative to a command current. Here, a d-q plane is defined by a d-axis and a q-axis to be used for vector control of the rotary electric machine 20. In the vector control of the three-phase synchronous electric motor of rotary magnetic field, the direction of magnetic flux generated by a magnetic pole of a rotor is defined in the d-axis, and the q-axis is defined in the orthogonal direction to the d-axis. The d-q plane is thus formed by the d-axis and the q-axis as two coordinate axes, which are orthogonal to each other.

A rotary electric machine is expressed mathematically as follows in theory, by using a d-axis inductance Ld, a q-axis inductance Lq, a winding resistance R, an electric angular velocity ω, a counter-electromotive force ψ, a d-axis current Id, a q-axis current Iq, a d-axis voltage Vd and a q-axis voltage Vq of the rotary electric machine.

$$Vd = R \times Id - \omega \times Lq \times Iq$$

$$Vq = R \times Iq + \omega \times Ld \times Id + \omega \times \psi$$

Further, torque T is expressed as follows by assuming that the number of poles of the rotary electric machine is p.

$$T = p \times \psi \times Iq + p \times (Ld - Lq) \times Id \times Iq$$

It is assumed that an absolute value Ia of a current vector, which is defined by the d-axis current Id and the q-axis current Iq, and a current phase β are expressed as follows.

$$Ia=(Id^2+Iq^2)^{1/2}$$

$$\beta=\tan^{-1}(Iq/Id)$$

Then, the torque T is expressed as follows.

$$T=p\times\psi\times Ia\times\sin\beta+(\tfrac{1}{2})\times p\times(Ld-Lq)\times Ia^2\times\sin 2\beta$$

It is understood from this expression that the torque T is controllable by the current phase β. That is, the current phase indicates a phase between a d-axis current component and a q-axis current component in the current.

Thus, the torque of the rotary electric machine 20 can be controlled by controlling the current phase β. The current phase β that provides a maximum torque can be determined by differentiating the equation of the torque T by the current phase β and applying zero thereto. That is, the current phase β at the maximum torque is expressed as follows.

$$\beta=\cos^{-1}[[-\psi+\{\psi^2-8\times(Ld-Lq)^2\}^{1/2}]/4\times(Ld-Lq)\times Ia]$$

The characteristic line, which enables the rotary electric machine 20 to be driven at the maximum efficiency, can be determined by adding certain appropriate corrections to the equation determined as above.

A maximum efficiency characteristic line 62, which is determined as above, is shown in FIG. 3. If the current command is performed on the maximum efficiency characteristic line 62, the rotary electric machine 20 can be driven at the maximum efficiency. The current command performed on the maximum efficiency characteristic line 62 is referred to as the first current command.

This maximum efficiency characteristic line 62 is a characteristic line, which is defined by connecting current pairs. Each current pair is a pair or combination of a d-axis current and a q-axis current, which satisfies the current phase β when the rotary electric machine 20 produces the maximum torque. In FIG. 3, a first voltage command characteristic line 72 is also shown. This characteristic line 72 is defined by connecting voltage pairs, each of which is a combination of a d-axis voltage corresponding to the d-axis current and a q-axis voltage corresponding to the q-axis current.

A maximum voltage supplied to the rotary electric machine 20 is shown by a dotted line 70 as a maximum voltage circle. In the rectangular wave voltage phase control mode, the torque of the rotary electric machine 20 is controlled by controlling the voltage phase on the maximum voltage circle 70 when the amplitude of the rectangular wave voltage is constant. Therefore, the first voltage command characteristic line 72 inside the maximum voltage circle 70 corresponds to the voltage pairs of the d-axis voltage and the q-axis voltage of the voltage command at the maximum efficiency operation in the sinusoidal wave current control mode and the overmodulation current control mode. This voltage command is referred to as a first voltage command in correspondence to the first current command. Performing the first voltage command means determination of a first command voltage (first voltage command value).

By thus using the d-q plane, the maximum efficiency characteristic line 62 is defined, by which the first current command is performed to maximize the efficiency of operation of the rotary electric machine 20 in the sinusoidal wave current control mode and the overmodulation current control mode. Further, the first voltage command characteristic line 72 is defined in correspondence to the maximum efficiency characteristic line 62 so that the first voltage command is performed on the first voltage command characteristic line 72. The command voltage is determined in accordance with the maximum voltage circle 70 in the rectangular wave voltage phase control mode.

A switching line 64 shown in FIG. 3 is a second characteristic line, which is set to have a predetermined phase difference in a retard angle side relative to the maximum efficiency characteristic line 62 on the d-q plane. The switching line 64 is provided as a reference to determine the switching-over from the rectangular wave voltage phase control mode to the overmodulation current control mode when the operation point of the rotary electric machine, which is determined by a pair of the d-axis current and the q-axis current, reaches this line.

The switching line 64 is provided at the retard angle side from the maximum efficiency characteristic line 62, that is, the phase is returned in the clockwise direction in the d-q plane, for the following reason. When the rotary electric machine 20 operates in a range of high torque and high rotation speed, it is operated by the rectangular wave voltage phase control mode. When the rotary electric machine 20 changes its operation range from the high torque and high rotation speed range to a range of low torque and low rotation speed, the current phase gradually changes in the retard angle side. Thus, the operation point of the rotary electric machine 20 comes to cross the maximum efficiency characteristic line 62.

After the control mode is switched over from the rectangular wave voltage phase control mode to the overmodulation current control mode, the rotary electric machine 20 can be operated at the maximum efficiency by performing the first current command on the maximum efficiency characteristic line 62. Therefore, it is possible to set a switching line at an advance angle side of the maximum efficiency characteristic line 62. If the control mode is switched over at the advance angle side relative to the maximum efficiency characteristic line, the control chatters and causes current disturbance at the time of switching over the control mode. Therefore, the switching-over of the control mode is performed at the retard angle side on the d-q plane relative to the maximum efficiency characteristic line 62 as a reference, by which the first current command is performed.

A second voltage command characteristic line 74 shown in FIG. 3 corresponds to the switching line 64, and is defined by connecting voltage pairs of a d-axis voltage and a q-axis voltage, which correspond to the current pairs of the d-axis current and the q-axis current of the switching line 64.

Figure 4:
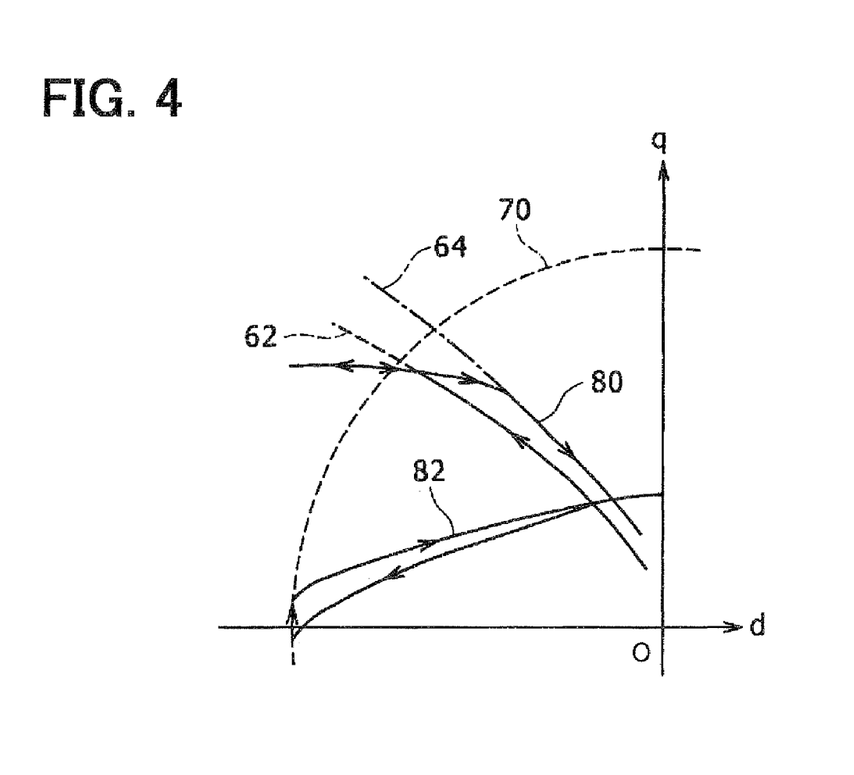
FIG. 4 is a graph showing operations of a first current command module, a command change module and a second current command module in the embodiment.

Operations of the first current command module 40, the mode switching module 42 and the second current command module 46 are shown in FIG. 4. As described with reference to FIG. 3, the switching line 64 is used as a reference to determine the switching-over from the rectangular wave voltage phase control mode to the overmodulation current control mode. In this embodiment, as shown in FIG. 4, the switching line 64 is used as a current command characteristic line, that is, as a reference to perform the second current command, in addition to the reference as the switching-over of the control mode.

In FIG. 4, a current phase trajectory 80 and a corresponding voltage phase trajectory 82 are shown in FIG. 4, in which arrows indicate directions of change from the low torque and low rotation speed condition to the high speed and high rotation speed condition, and back to the low torque and low rotation speed condition again.

When the rotary electric machine 20 is started and driven to increase its torque and rotation speed from the low torque and low rotation speed condition, the sinusoidal wave current control mode is used and the first current command is performed on the maximum efficiency characteristic line 62. This operation is performed by the sinusoidal wave current control module 32 and the first current command module 40 of the control unit 30.

When the rotary electric machine 20 is operated in a medium or intermediate speed range, that is, the modulation rate exceeds 0.61 for example, the control mode is switched over to the overmodulation current control mode. In this mode, the first current command is also performed on the maximum efficiency characteristic line 62.

When the torque and rotation speed further increase, that is, when the modulation rate exceeds 0.78, the control mode is switched over to the rectangular wave voltage phase control mode. As a result, the current phase deviates from the maximum efficiency characteristic line 62. In the rectangular wave voltage phase control mode, the voltage command changes from a first voltage command characteristic line 72 to the maximum voltage circle 70, and the torque is controlled by the voltage phase. This function is performed by the rectangular wave voltage phase control module 36 of the control unit 30.

When the torque and the rotation speed of the rotary electric machine 20 fall from those of the rectangular wave voltage phase control mode, the current and the voltage change in the opposite direction. If the current phase crosses the maximum efficiency characteristic line 62 and reaches the switching line 64, the control mode is switched over from the rectangular wave voltage phase control mode to the overmodulation current control mode by using the switching line 64 as the reference line for determining the switching-over point. This processing is performed as the function of the mode switching module 42 of the control unit 30.

After the switching-over of the control mode, the second current command is performed in accordance with the current phase characteristic indicated by the switching line 64 as the function of the current command characteristic line of the switching line 64. Specifically, the overmodulation current control mode is performed on the switching line 64 and the current command is performed along the switching line 64 so that the operation condition of the rotary electric machine 20 is changed to the low speed and low torque side.

It is noted that the operation point of the rotary electric machine 20 is not returned to a point of the maximum efficiency characteristic line immediately after the switching-over. Therefore, relative to the maximum amplitude of the last voltage command of the rectangular wave voltage phase control mode and the phase at that time, the voltage command performed in the overmodulation current control mode is smoothly changed. As a result, it is suppressed that the PWM pattern of the rotary electric machine loses its symmetric characteristic and decreases torque.

The switching line 64 is different from the maximum efficiency characteristic line 62 in current phase. As a result, if the second current command is performed in accordance with the current pair of the switching line 64, the efficiency of the rotary electric machine 20 will be decreased a little bit in comparison with the case, in which the first current command is performed in accordance with the current phase characteristic indicated by the maximum efficiency characteristic line 62. The second current command in accordance with the switching line 64 is performed only for a predetermined period, and the first current command in accordance with the maximum efficiency characteristic line 62 is performed again. Thus, the current command is returned from the second current command to the first current command by the return module 46 of the control unit 46.

If the predetermined time for return is too short, the prior art problem cannot be solved. If the predetermined time for return is too long, the efficiency of the rotary electric machine 20 is lowered. It is therefore preferred to implement any one of the following exemplary return methods.

As the first method, the current command may be returned from the switching line 64 to the maximum efficiency characteristic line 62 by lengthening a control period by smoothing at a predetermined time constant. The time constant may be set to correspond to a delay time, by which chattering generated at the time of switching over from the overmodulation current control mode to the rectangular wave voltage phase control mode can be suppressed. Assuming that the normal control period is to and the delay time required to suppress chattering is td, the time constant is set so that to is longer than td. Thus, the control period is lengthened to smoothly change the current command, so that the current command is changed from the switching line 64 to the maximum efficiency characteristic line 62 in the lengthened control period. It is noted that the control period is an interval of each calculation of the current command value.

Figure 5:
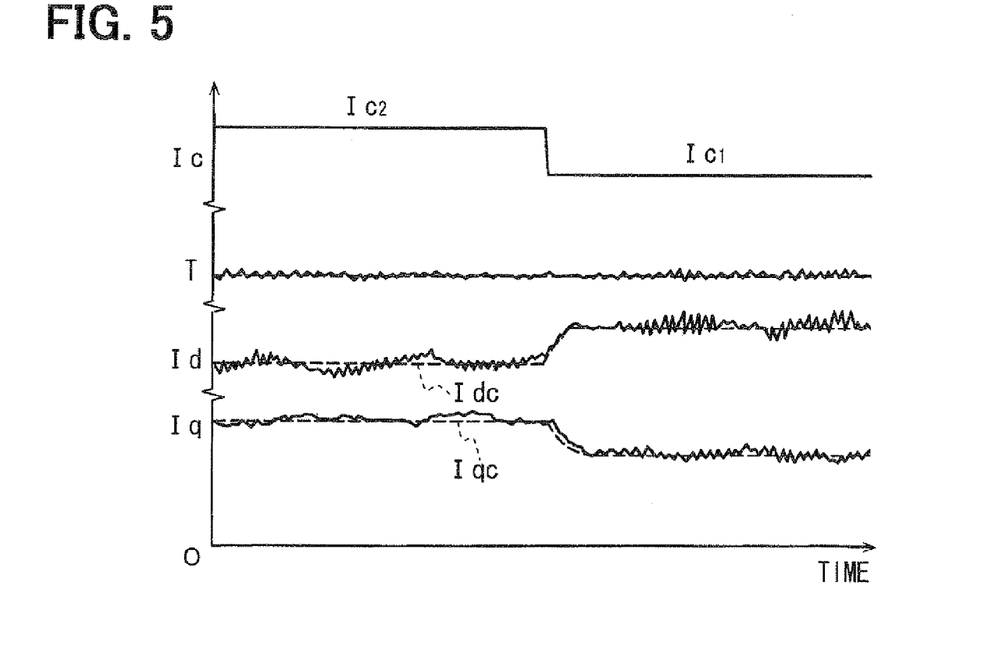
FIG. 5 is an operation diagram showing return from a second command current to a first command current under a long control period in the embodiment.
Figure 6:
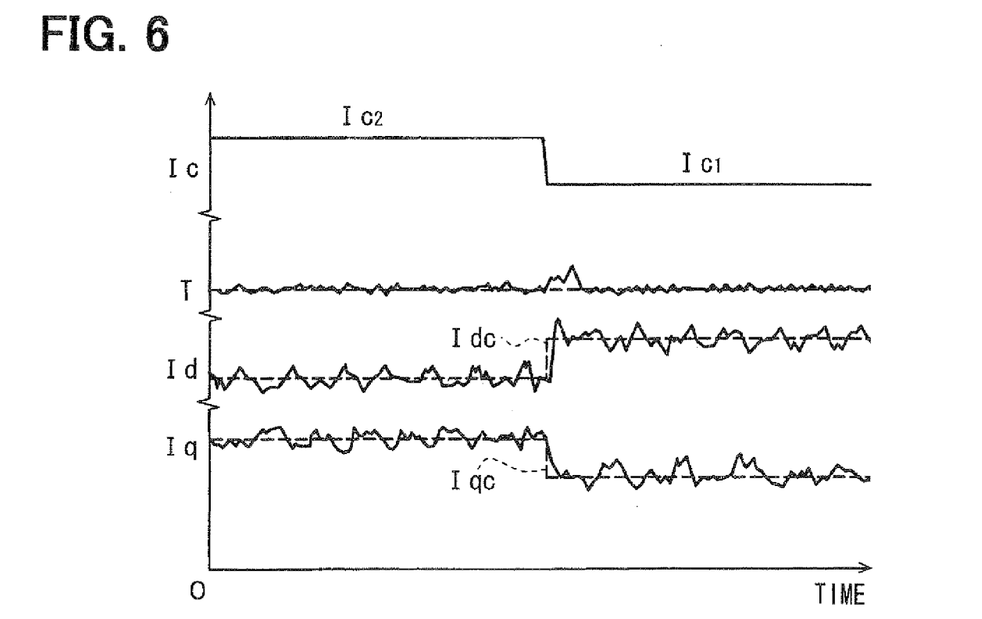
FIG. 6 is an operation diagram showing return from the second command current to the first command current under a normal control period in the embodiment.

This operation is shown in FIGS. 5 and 6, which show cases of the return of control in the long control period and the normal control period, respectively. In FIGS. 5 and 6, the abscissa indicates time and the ordinate indicates command currents Ic (Ic1 or Ic2), torque T, d-axis current Id and q-axis current Iq.

In FIG. 5, since the command current Ic is returned from the second command current Ic2 to the first command current Ic1 by smoothing the control period, both the d-axis current Id and the q-axis current Iq change smoothly without deviating largely from the command currents Idc and Iqc indicated by dotted lines. Thus, by the smoothing processing on the control period, the command current can be changed slowly from the second command current Ic2 to the first current command Ic1 thereby maintaining the torque T substantially unchanged.

In FIG. 6, if the command current Ic is returned from the second command current Ic2 to the first command current Ic1 without smoothing the control period, that is, by the normal control period, the d-axis current Id and the q-axis current Iq overshoot and undershoot relative to the command currents Idc and Iqc indicated by dotted lines. It is noted that the d-axis command current Idc and the q-axis command current Iqc are not smoothed in comparison to the case of FIG. 5. As a result, torque changes are generated. This torque change is particularly large when the command current is changed from the second command current Ic2 to the first command current Ic1.

As the second example, the performance of the current command may be returned from the switching line 64 to the maximum efficiency characteristic line 62 within a predetermined range of change rate of a command current (current command value). As shown in FIG. 5, the change rate of the command current corresponds to the smoothing processing, the range of change rate of the command current can be set to correspond to a delay time, which can suppress chattering.

Figure 7:
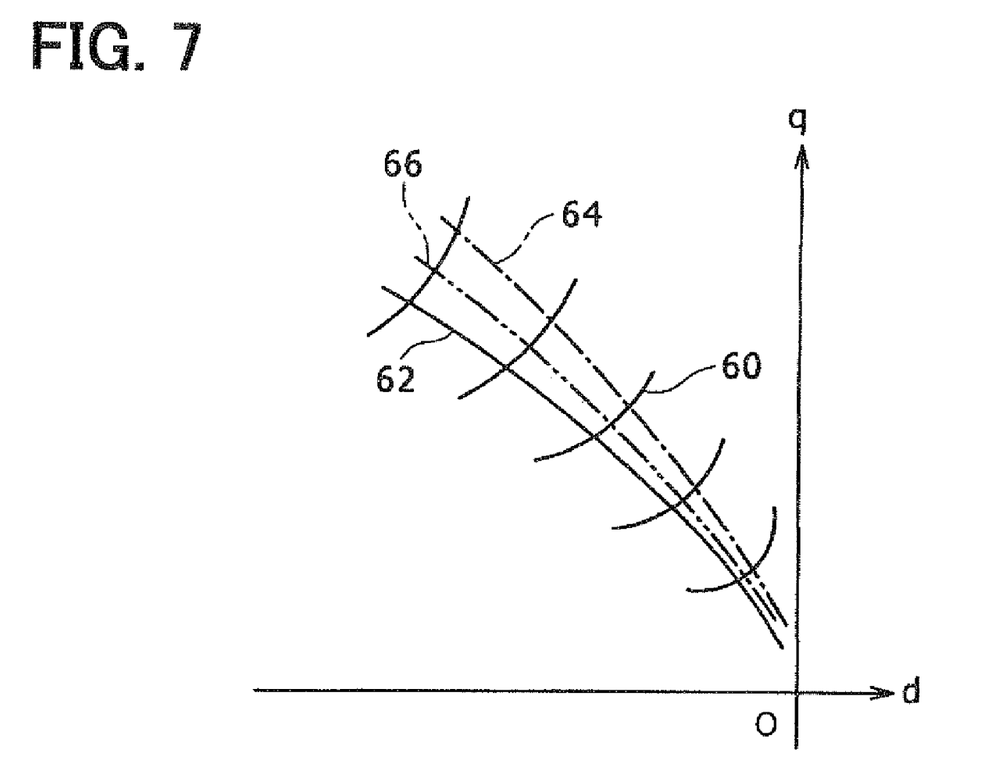
FIG. 7 is a graph showing an intermediate characteristic line provided in addition to the characteristic lines shown in FIG. 3.

As the third example, the performance of the current command may be returned from the switching line 64 to the maximum efficiency characteristic line 62 through an intermediate characteristic line 66 provided between the maximum efficiency characteristic line 62 and the switching line 64 on the d-q plane as shown in FIG. 7. The intermediate characteristic line 66 is set at a retard angle side relative to the maximum efficiency characteristic line 62 and at an advance angle side relative to the switching line 64.

In FIG. 7, equitorque characteristic lines 60 are also shown. Each equitorque characteristic line is similar to a hyperbolic curve on the d-q plane as understood from the following expression of torque.

$$T = p \times \psi \times Iq + p \times (Ld - Lq) \times Id \times Iq$$

Figure 8:
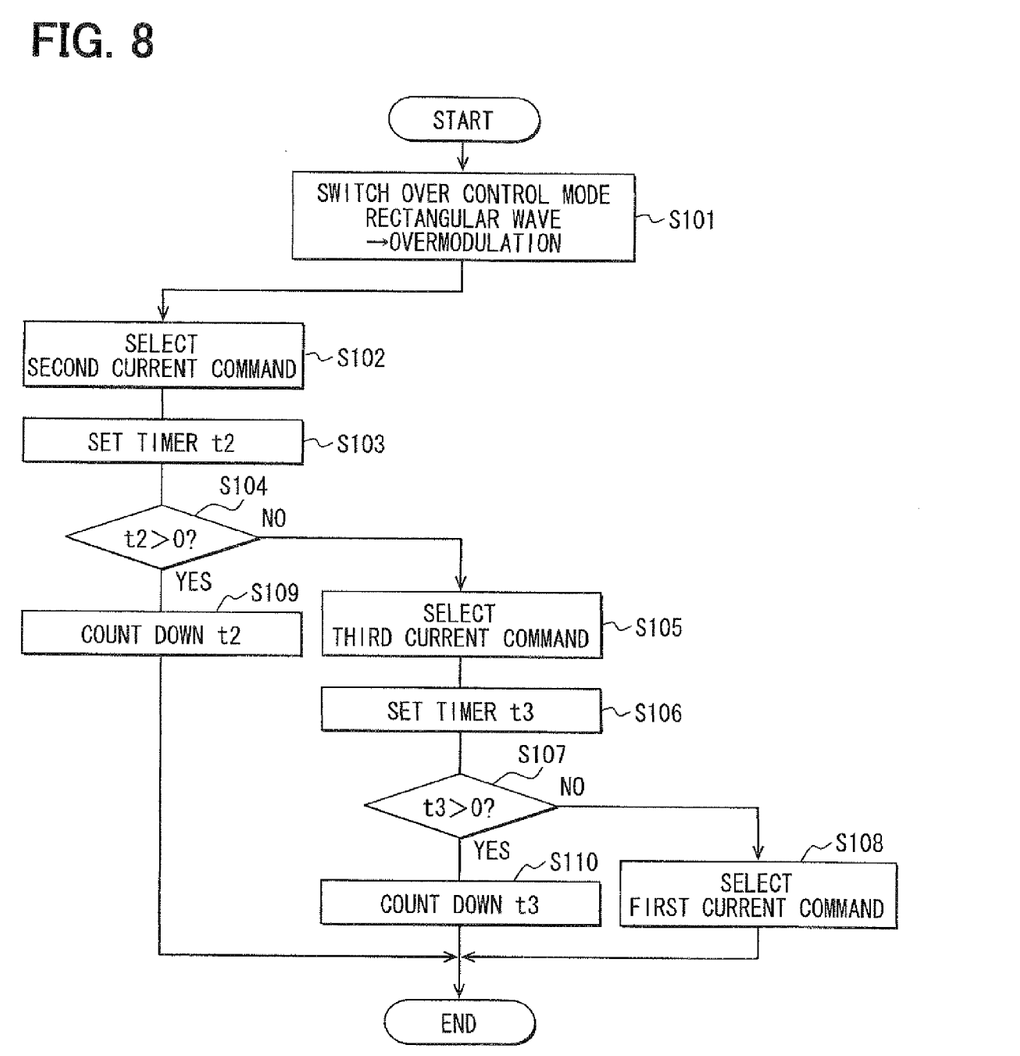
FIG. 8 is a flowchart showing processing of returning from the second command current to the first command current through a third command current determined in correspondence to the intermediate characteristic line in the embodiment.

A third current command is performed on the intermediate characteristic line 66. The current command is returned through the third current command as shown in FIG. 8. Specifically, when the switching-over of the control mode from the rectangular wave voltage phase control mode to the overmodulation current control mode (S101), the second current command is selected on the switching line 64 (S102) and a timer t2 is set (S103) to thereby start count-down of the timer value. If the count of the timer t2 becomes zero (S104: NO), the third current command of the intermediate characteristic line 66 is selected (S105) and a timer t3 is set (S106). If the count of the timer t3 becomes zero (S107: NO), the first current command of the maximum efficiency characteristic line 62 is selected (S108).

Until the count of the timer t2 becomes zero (S103: YES), that is, during a predetermined period (timer t2), the timer t2 is counted down (S109) so that the second current command is performed on the switching line 64 during the period of timer t2. Further, until the count of the timer t3 becomes zero (S107: YES), that is, during a predetermined period (timer t3), the timer t3 is counted down (S110) so that the third current command is performed on the intermediate characteristic line 66. Since the current command is changed from the switching line 64 to the maximum efficiency characteristic line 62 by way of the time periods t2+t3, both the d-axis current and the q-axis current are suppressed from overshooting and undershooting relative to the change in the command current.

As the fourth example, the performance of the current command may be returned from the switching line 64 to the maximum efficiency characteristic line 62 instantly within the same control period, when a difference (Ic1−Ic2) between the first command current Ic1 and the second command current Ic2 determined on the maximum efficiency characteristic line 62 and the switching line 64 under the same torque condition, respectively, becomes less than a predetermined current difference threshold.

As understood from FIG. 5, if the current difference is small when the second command current Ic2 is returned to the first command current Ic1, the d-axis current Id and the q-axis current Iq are suppressed from overshooting and undershooting. For this reason, the current difference threshold is set to a current difference, which will limit the overshooting and undershooting to a level that will not cause torque variations.

Figure 9:
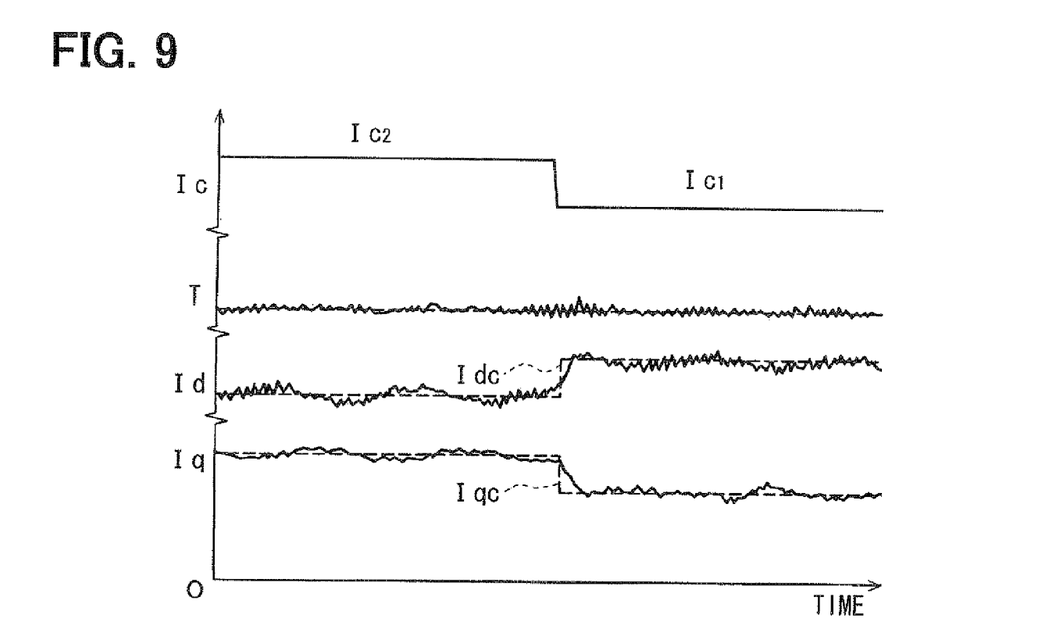
FIG. 9 is an operation diagram showing a case, in which a current difference is smaller than a threshold at the time of return from the second command current to the first command current.

This example is shown in FIG. 9 in comparison with FIGS. 5 and 6. Since the current difference is small when the second command current Ic2 is returned to the first command current Ic1, the d-axis current Id and the q-axis current Iq are suppressed from overshooting and undershooting considerably without smoothing processing of FIG. 5.

As the fifth example, the performance of the second current command may be returned from the switching line 64 to the maximum efficiency characteristic line 62, when the command current Ic is changed to correspond to a command voltage, at which the first voltage command characteristic line 72 and the second voltage command characteristic line 74 cross each other on the d-q plane.

Figure 10:
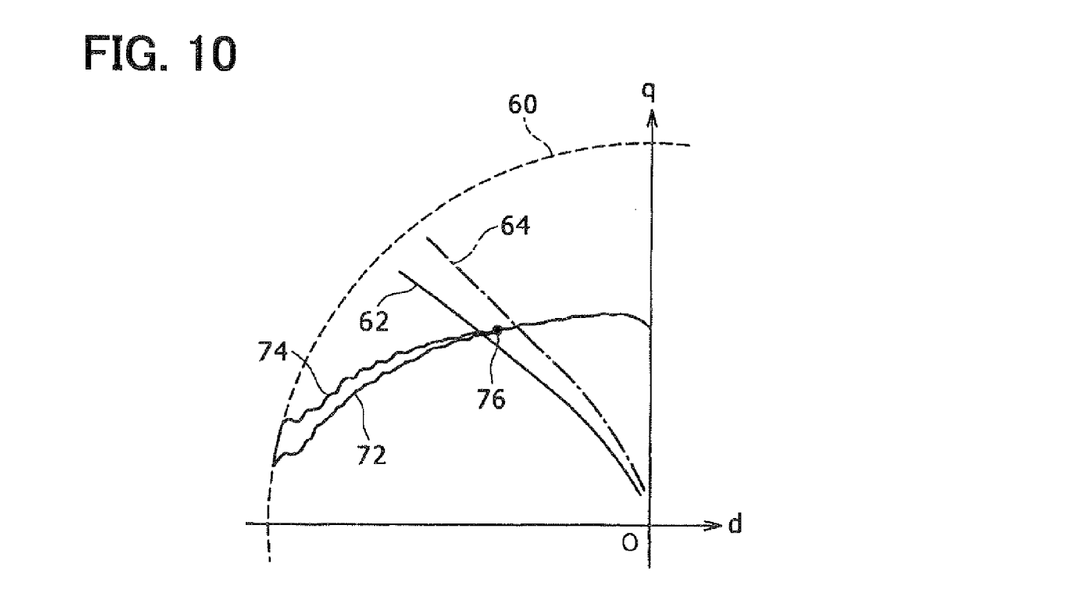
FIG. 10 is a graph showing an operation point, at which a first voltage command characteristic line and a second voltage command characteristic line cross each other in the embodiment.

This example is shown in FIG. 10 in comparison with FIGS. 3 and 4. As shown in FIG. 10, the first voltage command characteristic line 72 and the second voltage command line 74 cross at an operation point 76. When the second command current on the switching line 64 becomes equal to the command current, which corresponds to the operation point 76, no voltage difference is caused even if the command current Ic is changed from the second command current Ic2 to the first command current Ic1. Therefore, the d-axis current Id and the q-axis current Iq are suppressed from overshooting and undershooting.

As the sixth example, the current command may be returned from the switching line 64 to the maximum efficiency characteristic line 62 before the first voltage command characteristic line 72 and the second voltage characteristic line 74 come to cross each other, that is, the voltage difference becomes less than a predetermined voltage difference threshold before becoming zero. The predetermined voltage difference threshold may be set to correspond to a voltage difference, which will limit the overshooting and undershooting to a level that causes no torque variation.

As the seventh example, the performance of the current command may be returned from the switching line 64 to the maximum efficiency characteristic line 62, when the first command voltage of the first voltage command characteristic line 72 enters a range of performance of the sinusoidal wave current control mode. In the range of performance of the sinusoidal wave current control mode, the voltage and the current are both small and response is quick. As a result, the difference between the first command current and the second command current is small. Thus, the d-axis current and the q-axis current are suppressed from overshooting and undershooting.

As described above, according to the embodiment, the second current command is continued on the switching line 64 for the predetermined period after the control mode is switched over from the rectangular wave voltage phase control mode to the overmodulation current control mode, and thereafter the first current command is performed on the maximum efficiency characteristic line 62. As a result, the d-axis current and the q-axis current are suppressed from overshooting and undershooting, and hence torque decrease is suppressed.

The operation and the advantage of the embodiment are described below in comparison with the operation according to the prior art, in which the switching line 64 is used to determine the switching-over of the control mode and the current command is performed only on the maximum efficiency characteristic line 62 after the switching-over of the control mode.

Figure 11:
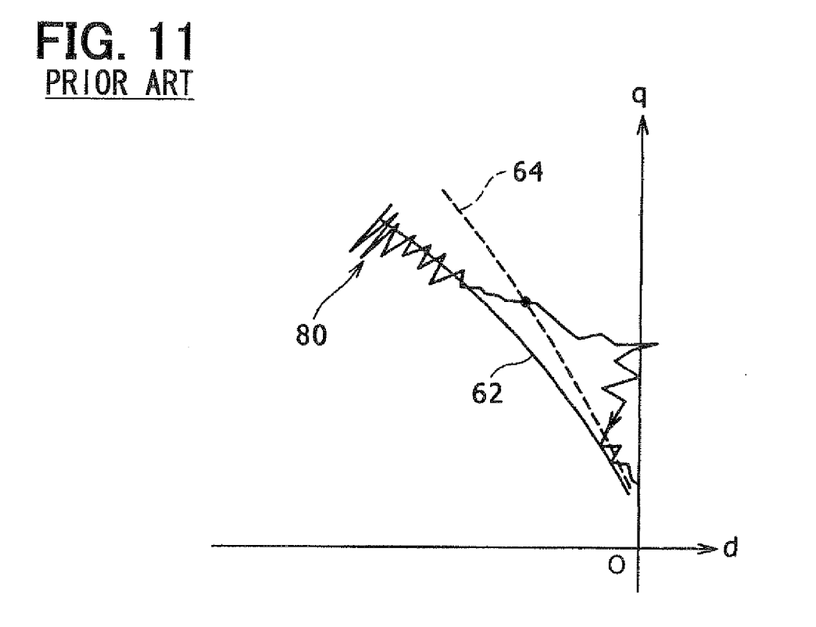
FIG. 11 is a graph showing a trajectory of current phase on a d-q plane in a prior art.

In the case of the prior art, as shown in FIG. 11, the current changes greatly as shown by a trajectory 80 deviating from the lines 62 and 64. That is, the current disturbance is particularly large after the control mode is switched over on the switching line 64 and returned to the maximum efficiency characteristic line 62.

Figure 12:
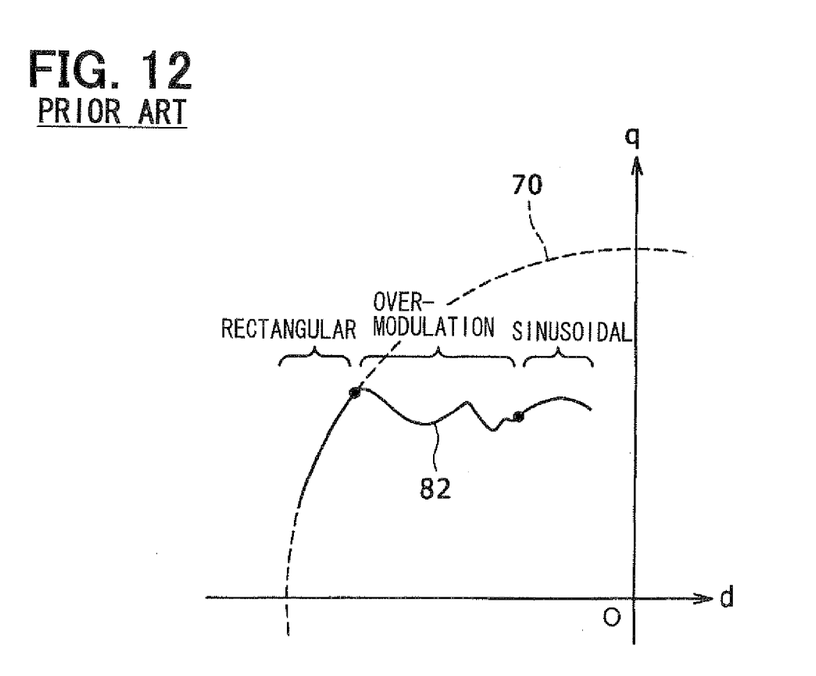
FIG. 12 is a graph showing a trajectory of voltage phase on the d-q plane in the prior art.

A voltage phase trajectory 82 according to the prior art is shown in the d-q plane of FIG. 12. It is understood that, when the control mode is switched from the rectangular wave voltage phase control mode to the sinusoidal wave current control mode through the overmodulation current control mode, the voltage changes greatly resulting in a large voltage disturbance in a period of overmodulation current control mode.

Figure 13:
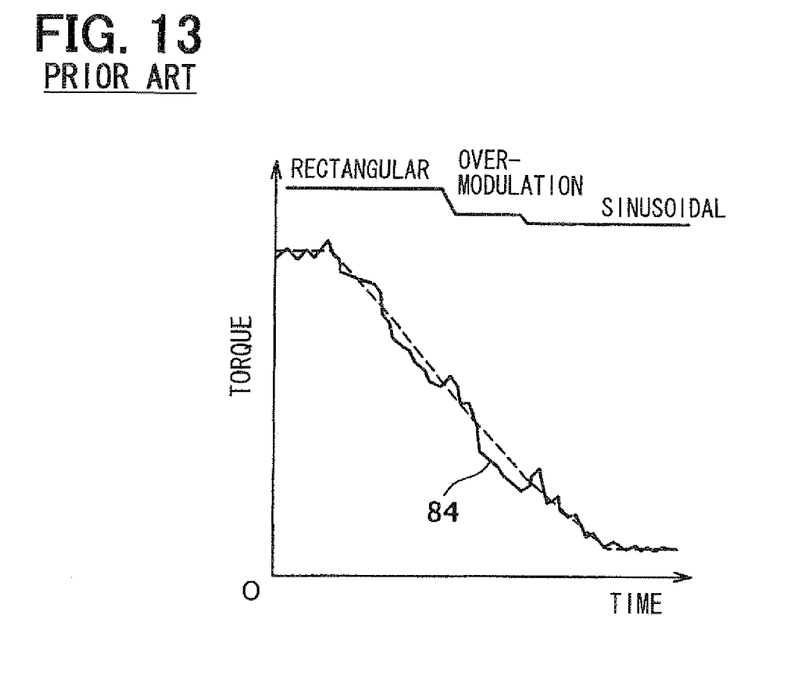
FIG. 13 is a graph showing torque in the prior art.

A torque trajectory 84 according to the prior art is shown by a solid line in FIG. 13 relative to a command torque shown by a dotted line as gradually decreasing from a large value to a small value. As the command torque is decreased, the control mode is switched over from the rectangular wave voltage phase control mode to the sinusoidal wave current control mode through the overmodulation current control mode. The actual torque indicated by the trajectory 84 largely deviates to be lower than the command torque in the overmodulation current control mode.

Figure 14:
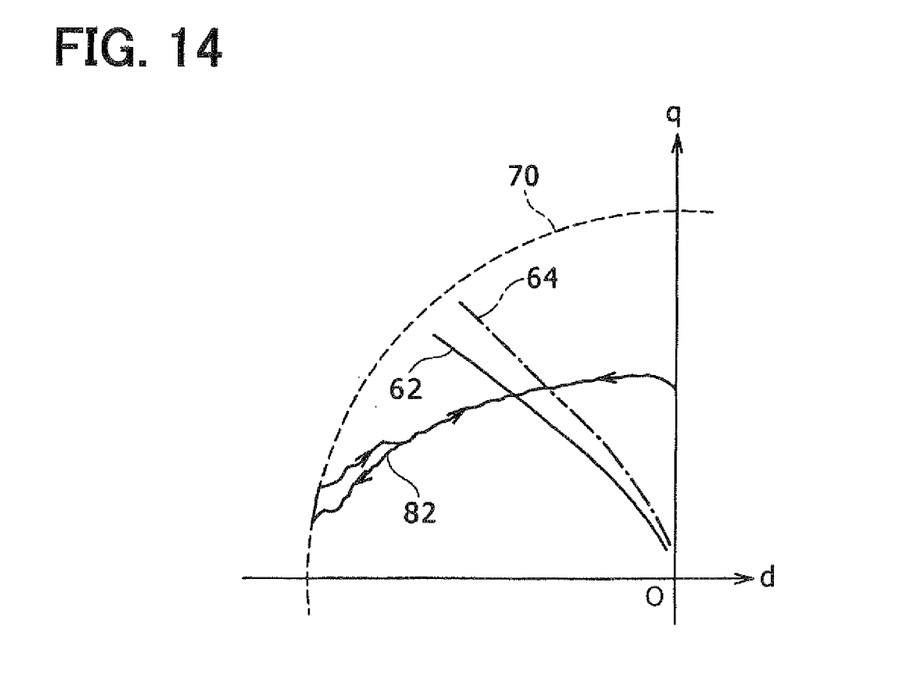
FIG. 14 is a graph showing a trajectory of voltage phase in the embodiment.

The voltage phase trajectory 82 according to the embodiment is shown in FIG. 14, assuming that the current command is performed on the switching line 64 and returned to the maximum efficiency characteristic line 62 after the predetermined period. It is also assumed here that the torque is increased from zero to a maximum and returned to zero again. In this case, as shown in FIG. 14, the torque is increased in line with the first voltage command characteristic line and the control mode is switched over to the rectangular wave voltage phase control mode on the maximum voltage circle 70. The control mode is thereafter switched back to the overmodulation current control mode to perform the control on the second voltage command characteristic line. It is understood that the voltage has no disturbance when the control is returned from the second voltage command characteristic line to the first voltage command characteristic line, although the voltage disturbance is large in the overmodulation current control mode according to the prior art as shown in FIG. 12.

Figure 15:
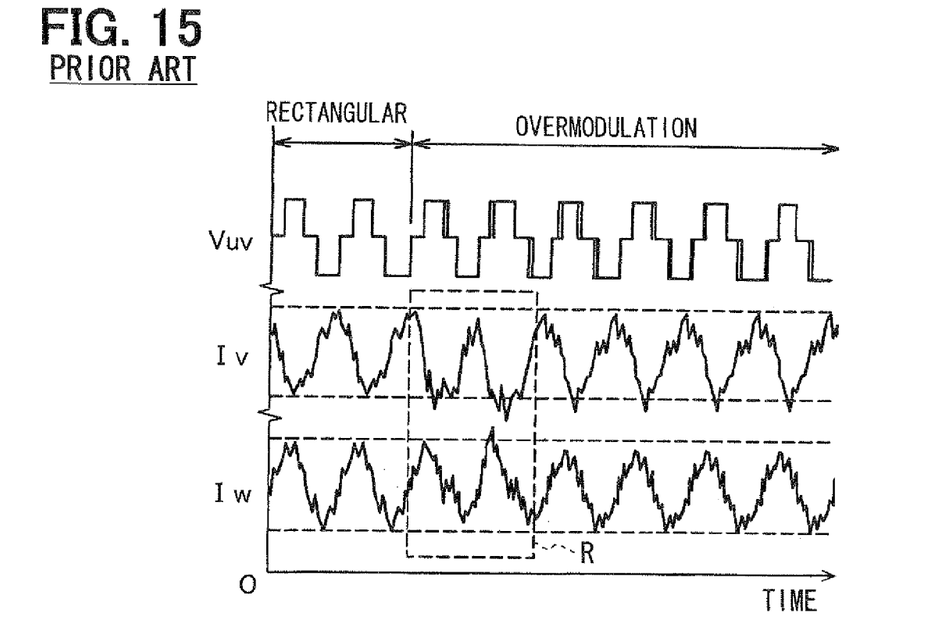
FIG. 15 is an operation diagram showing stability of current control in the prior art.
Figure 16:
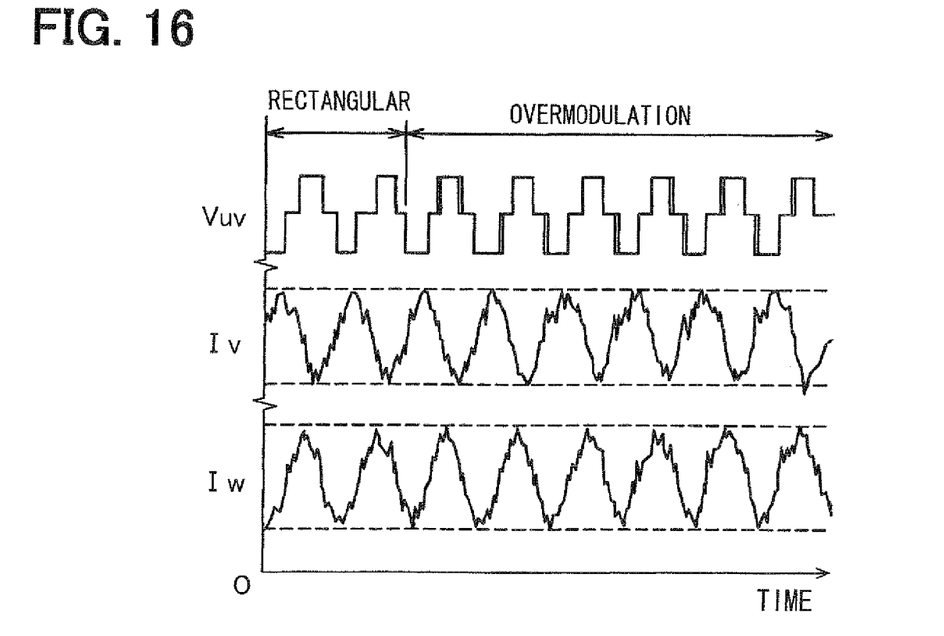
FIG. 16 is an operation diagram showing stability of current control in the embodiment.

The current control at the time of switching-over from the rectangular wave voltage phase control mode to the overmodulation current control mode according to the prior art and the embodiment is shown in FIGS. 15 and 16, respectively, for comparison. In FIGS. 15 and 16, the abscissa indicates time and the ordinate indicates an interphase voltage Vuv between the U-phase and the V-phase of the rotary electric machine of three-phase (U, V, W) as well as the phase currents Iv of the V-phase and Iw of the W-phase of the rotary electric machine.

As indicated by a dotted-line rectangle R in FIG. 15, in the prior art, the interphase voltage and the phase currents are disturbed and the stability of current control is lowered immediately after the switching-over of the control mode from the rectangular wave voltage phase control mode to the overmodulation current control mode. However, as understood from FIG. 16, such disturbance in the interphase voltage and in the phase currents are suppressed in the embodiment. Thus, stable current control can be performed.

What is claimed is:

1. A rotary electric machine control system for controlling a rotary electric machine according a vector control, which uses a d-q plane defined by a d-axis indicating a d-axis current and a q-axis indicating a q-axis current and orthogonal to the d-axis, the control system comprising:
    mode switching means for switching over a control mode among a sinusoidal wave current control mode, an overmodulation current control mode and a rectangular wave voltage phase control mode;
    first current command means for performing a first current command in the overmodulation current control mode based on a maximum efficiency characteristic line when the control mode is switched over from the sinusoidal wave current control mode to the overmodulation current control mode, the maximum efficiency characteristic line being formed by connection of pairs of the d-axis current and the q-axis current on the d-q plane, and each pair corresponding to an operation point at which a rotary electric machine operates at a maximum efficiency; and
    second current command means for performing a second current command in the overmodulation current control mode based on a switching line different from the maximum efficiency characteristic line for a predetermined period after the control mode is switched over from the rectangular wave voltage control mode to the overmodulation current control mode,
    wherein the switching line is formed by connection of pairs of the d-axis current and the q-axis current on the d-q plane and provided on a retard angle side relative to the maximum efficiency characteristic line, the retard angle side being in a clockwise direction from the maximum efficiency characteristic line towards the q-axis on the d-q plane.

2. The rotary electric machine control system according to claim 1, further comprising:
    return means for returning a current command from the second current command to the first current command, which is performed on the maximum efficiency characteristic line, after performing the second current command on the switching line for the predetermined period.

3. The rotary electric machine control system according to claim 2, wherein:
    the return means is configured to return the current command from the switching line to the maximum efficiency characteristic line by smoothing a control period to a longer period at a predetermined time constant, which corresponds to a delay time for suppressing chatters arising when the control mode is switched from the overmodulation current control mode to the rectangular wave voltage phase control mode.

4. The rotary electric machine control system according to claim 2, wherein:
    the return means is configured to return the current command from the switching line to the maximum efficiency characteristic line within a predetermined range of change rate of a command current.

5. The rotary electric machine control system according to claim 2, further comprising:
    intermediate current command means for performing the current command on an intermediate characteristic line, which is provided at a retard angle side relative to the maximum efficiency characteristic line and at an advance angle side relative to the switching line,
    wherein the return means is configured to return the current command to the maximum efficiency characteristic line from the switching line through the intermediate characteristic line.

6. The rotary electric machine control system according to claim 2, wherein:
    the return means is configured to return the current command from the switching line to the maximum efficiency characteristic line within a same control period instantly, when a command current difference between a second command current of the switching line and a first command current of the maximum efficiency characteristic line corresponding to the second command current becomes less than a predetermined current difference threshold under a condition that torque of the rotary electric machine is unchanged.

7. The rotary electric machine control system according to claim 2, wherein:
    the return means is configured to return the current command from the switching line to the maximum efficiency characteristic line, when a command current comes to correspond to a command voltage, at which a first voltage command characteristic line and a second voltage command characteristic line cross in the d-q plane, the first voltage command characteristic line being defined by connecting voltage pairs of a d-axis voltage and a q-axis voltage calculated in correspondence to the maximum efficiency characteristic line, and the second voltage command characteristic line being defined by connecting voltage pairs of a d-voltage and a q-voltage calculated in correspondence to the switching line.

8. The rotary electric machine control system according to claim 7, wherein:
    the return means is configured to return the current command from the switching line to the maximum efficiency characteristic line, when a command voltage difference between a first command voltage and a second command voltage becomes less than a predetermined voltage difference threshold before becoming zero under a condition that torque of the rotary electric machine is unchanged, the first command voltage being corresponding to the first command current and the second command voltage being corresponding to the second command current.

9. The rotary electric machine control system according to claim 2, wherein:
the return means is configured to return the current command from the switching line to the maximum efficiency characteristic line, when a first command voltage of a first voltage command characteristic line, which corresponds to a first command current of the maximum efficiency characteristic line, enters into a region of the sinusoidal wave current control mode under a condition that torque of the rotary electric machine is unchanged.

10. The control system according to claim 1, wherein:
the mode switching means switches over the control mode from the rectangular wave voltage phase control mode to the overmodulation current control mode when the operation point of the rotary electric machine crosses the maximum efficiency characteristic line from an advance angle side to the retard angle side and reaches the switching line on the d-q plane, the advance angle side being in a counterclockwise direction from the maximum efficiency characteristic line towards the d-axis on the d-q plane.

11. A method of controlling a rotary electric machine according a vector control, which uses a d-q plane defined by a d-axis indicating a d-axis current and a q-axis indicating a q-axis current and orthogonal to the d-axis, the method comprising:
switching over a control mode among a sinusoidal wave current control mode, an overmodulation current control mode and a rectangular wave voltage phase control mode;
performing a first current command in the overmodulation current control mode based on a maximum efficiency characteristic line when the control mode is switched over from the sinusoidal wave current control mode to the overmodulation current control mode, the maximum efficiency characteristic line being formed by connection of pairs of the d-axis current and the q-axis current on the d-q plane, and each pair corresponding to an operation point at which a rotary electric machine operates at a maximum efficiency; and
performing a second current command in the overmodulation current control mode based on a switching line different from the maximum efficiency characteristic line for a predetermined period after the control mode is switched over from the rectangular wave voltage control mode to the overmodulation current control mode,
wherein the switching line is formed by connection of pairs of the d-axis current and the q-axis current on the d-q plane and provided on a retard angle side relative to the maximum efficiency characteristic line, the retard angle side being in a clockwise direction from the maximum efficiency characteristic line towards the q-axis on the d-q plane.

12. The method according to claim 11, wherein:
the control mode is switched over from the rectangular wave voltage phase control mode to the overmodulation current control mode when the operation point of the rotary electric machine crosses the maximum efficiency characteristic line from an advance angle side to the retard angle side and reaches the switching line on the d-q plane, the advance angle side being in a counterclockwise direction from the maximum efficiency characteristic line towards the d-axis on the d-q plane.

13. The method according to claim 11, further comprising:
returning a current command from the second current command to the first current command, which is performed on the maximum efficiency characteristic line, after performing the second current command on the switching line for the predetermined period.

14. The method according to claim 13, wherein:
the current command is returned from the switching line to the maximum efficiency characteristic line by smoothing a control period to a longer period at a predetermined time constant, which corresponds to a delay time for suppressing chatters arising when the control mode is switched from the overmodulation current control mode to the rectangular wave voltage phase control mode.

15. The method according to claim 13, wherein:
the current command is returned from the switching line to the maximum efficiency characteristic line within a predetermined range of change rate of a command current.

16. The method according to claim 13, further comprising:
performing the current command on an intermediate characteristic line, which is provided at a retard angle side relative to the maximum efficiency characteristic line and at an advance angle side relative to the switching line,
wherein the current command is returned to the maximum efficiency characteristic line from the switching line through the intermediate characteristic line.

17. The method according to claim 13, wherein:
the current command is returned from the switching line to the maximum efficiency characteristic line within a same control period instantly, when a command current difference between a second command current of the switching line and a first command current of the maximum efficiency characteristic line corresponding to the second command current becomes less than a predetermined current difference threshold under a condition that torque of the rotary electric machine is unchanged.

18. The method according to claim 13, wherein:
the current command is returned from the switching line to the maximum efficiency characteristic line, when a command current comes to correspond to a command voltage, at which a first voltage command characteristic line and a second voltage command characteristic line cross in the d-q plane, the first voltage command characteristic line being defined by connecting voltage pairs of a d-axis voltage and a q-axis voltage calculated in correspondence to the maximum efficiency characteristic line, and the second voltage command characteristic line being defined by connecting voltage pairs of a d-voltage and a q-voltage calculated in correspondence to the switching line.

19. The method according to claim 13, wherein:
the current command is returned from the switching line to the maximum efficiency characteristic line, when a first command voltage of a first voltage command characteristic line, which corresponds to a first command current of the maximum efficiency characteristic line, enters into a region of the sinusoidal wave current control mode under a condition that torque of the rotary electric machine is unchanged.

* * * * *